(12) United States Patent
Song et al.

(10) Patent No.: US 9,009,224 B2
(45) Date of Patent: *Apr. 14, 2015

(54) APPARATUS AND METHOD FOR SYNCHRONIZING E-BOOK CONTENT WITH VIDEO CONTENT AND SYSTEM THEREOF

(71) Applicant: Samsung Electronics Co., Ltd., Gyeonggi-do (KR)

(72) Inventors: Myoung-Jong Song, Hwaseong-si (KR); Myung-Jin Eom, Seoul (KR); Ik-Soo Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/961,504

(22) Filed: Aug. 7, 2013

(65) Prior Publication Data

US 2013/0326016 A1 Dec. 5, 2013

Related U.S. Application Data

(63) Continuation of application No. 12/915,450, filed on Oct. 29, 2010, now Pat. No. 8,527,581.

(30) Foreign Application Priority Data

Oct. 30, 2009 (KR) .......................... 10-2009-0104534

(51) Int. Cl.
*G06F 15/16* (2006.01)
*H04L 29/08* (2006.01)
(Continued)

(52) U.S. Cl.
CPC .............. *H04L 67/02* (2013.01); *G06F 3/1431* (2013.01); *G06F 3/147* (2013.01);
(Continued)

(58) Field of Classification Search
USPC .......... 709/231, 232, 236, 203, 217, 219, 223, 709/224
See application file for complete search history.

(56) References Cited

U.S. PATENT DOCUMENTS 6,260,011 B1  7/2001 Heckerman et al.
8,051,385 B1 * 11/2011 Yawitz et al. ................. 715/776
(Continued)

FOREIGN PATENT DOCUMENTS

CN   101212823 A   7/2008
CN   101568028 A   10/2009
(Continued)

OTHER PUBLICATIONS

International Search Report issued Aug. 1, 2011 in corresponding PCT Application No. PCT/KR2010/007469.
(Continued)

*Primary Examiner* — Lashonda Jacobs
(74) *Attorney, Agent, or Firm* — Sughrue Mion, PLLC

(57) ABSTRACT

A method of synchronizing a first device capable of displaying video content and including the video content, and a second device capable of displaying E-book content associated with the video content and including the E-book content. The first device is connected to the second device according to a specific protocol. In response to a specific event for the video content or the E-book content occurring in one of the first and second devices, the device in which the specific event occurs generates event information about the specific event and transmits it to the other of the first and second devices, and performs the specific event according to the event information. Upon receiving the event information, the other of the first and second devices performs the specific event according to the received event information in synchronization with the device in which the specific event occurred, using synchronization information between the video content and the E-book content.

38 Claims, 7 Drawing Sheets

(51) Int. Cl.
  *G06F 3/14* (2006.01)
  *G06F 3/147* (2006.01)
  *H04L 29/06* (2006.01)
  *H04N 21/43* (2011.01)

(52) U.S. Cl.
  CPC ....... *H04L 65/4015* (2013.01); *H04N 21/4307* (2013.01); *H04L 67/14* (2013.01); *G09G 2370/027* (2013.01); *G09G 2380/14* (2013.01)

(56) References Cited

U.S. PATENT DOCUMENTS

| | | | |
|---|---|---|---|
| 8,739,019 B1* | 5/2014 | Nevins | 715/203 |
| 2005/0022113 A1 | 1/2005 | Hanlon | |
| 2008/0133529 A1 | 6/2008 | Berkowitz et al. | |
| 2008/0168073 A1 | 7/2008 | Siegel et al. | |
| 2008/0177822 A1* | 7/2008 | Yoneda | 709/202 |
| 2008/0267283 A1 | 10/2008 | Smith et al. | |
| 2009/0204663 A1 | 8/2009 | Patwari | |
| 2010/0225809 A1 | 9/2010 | Connors et al. | |
| 2011/0044601 A1* | 2/2011 | Lee et al. | 386/219 |
| 2011/0047498 A1 | 2/2011 | Hendricks | |
| 2011/0167390 A1* | 7/2011 | Reed et al. | 715/854 |
| 2012/0162115 A1* | 6/2012 | Lim | 345/173 |
| 2012/0197998 A1 | 8/2012 | Kessel et al. | |
| 2013/0346838 A1* | 12/2013 | Henshall et al. | 715/203 |

FOREIGN PATENT DOCUMENTS

| | | |
|---|---|---|
| EP | 1758392 A2 | 2/2007 |
| JP | 2003-289506 A | 10/2003 |
| JP | 2007-36523 A | 2/2007 |
| KR | 20030025771 A | 3/2003 |
| KR | 10-0835109 A | 5/2008 |
| KR | 10-2009-0001695 A | 1/2009 |
| KR | 10-0902497 A | 6/2009 |
| RU | 2 335 800 C2 | 10/2008 |
| WO | 03/025816 A1 | 3/2003 |

OTHER PUBLICATIONS

Communication, dated Jul. 16, 2013, issued by the Japanese Patent Office in counterpart Japanese Patent Application No. 2012-536679.
Communication dated Mar. 5, 2014, issued by the State Intellectual Property Office of the People's Republic of China in counterpart Chinese Application No. 201080049402.0.
Communication dated Nov. 21, 2014 issued by the Russian Patent Office in counterpart Russian Patent Application No. 2012122179/08(033692).

* cited by examiner

APPARATUS AND METHOD FOR SYNCHRONIZING E-BOOK CONTENT WITH VIDEO CONTENT AND SYSTEM THEREOF

CROSS-REFERENCE TO RELATED APPLICATIONS

This is a continuation application of U.S. patent application No. 12/915,450 filed on Oct. 29, 2010, which issued as U.S. Pat. No. 8,527,581 and claims priority from Korean Patent Application No. 10-2009-0104534 filed on Oct. 30, 2009, in the Korean Intellectual Property Office, the entire disclosures of which are hereby incorporated by reference.

BACKGROUND

1. Field of the Invention

Apparatuses and methods consistent with the exemplary embodiments relate to an E-book, and more particularly, to synchronizing video content and E-book content.

2. Description of the Related Art

With the development of the Internet and digital technologies, E-book has been developed as a new alternative replacing the existing printed books. E-book technology enables a user to store texts in electronic form on a terminal, and read them on the terminal when desired. In other words, E-book may generally refer to publications made by processing content of books into information in digital form and storing the digital content information in recording media. E-book is called by many different names such as E-book, E-text, Online Book, and File Book.

E-book is expected to steadily grow in its use, replacing existing paper books, due to its portability and convenience that the user can read a variety of books on a portable E-book terminal without carrying the large and heavy books with him or her. In addition, compared with the existing printed books, E-book may contribute to simplification of distribution, reduction of inventory, output of various content, and efficient storage/management of content, etc.

In addition, if linked to multimedia content, E-book may contain more diverse types of information compared with existing text-oriented paper books. Therefore, in order to enable the use of E-book, convergence technology is required that can link text-oriented E-book content to multimedia content. In the field of E-book, the convergence technology requires synchronization technology for displaying E-book content in conjunction with, for example, video content, which is a typical example of multimedia content.

SUMMARY

One or more exemplary embodiments provide a synchronization method and apparatus for synchronizing multimedia content and E-book content.

One or more exemplary embodiments also provide a method and apparatus for synchronizing a device for displaying video content and a device for displaying E-book content.

One or more exemplary embodiments also provide a method and apparatus for synchronizing video content and E-book content in a device capable of displaying the video content and the E-book content together.

One or more exemplary embodiments also provide a method and apparatus capable of searching video content and E-book content in synchronization with each other in a device capable of displaying the video content and the E-book content together.

In accordance with an aspect of an exemplary embodiment, there is provided a method of synchronizing a first device capable of displaying video content and including the video content, and a second device capable of displaying E-book content associated with the video content and including the E-book content. In the synchronization method, the first device is connected to the second device according to a specific protocol. If a specific event for the video content or the E-book content occurs in any one of the first and second devices, the device in which the specific event occurs generates event information about the specific event, transmits the event information to the other device, and then performs the specific event according to the generated event information. Upon receiving the event information, the other device performs the specific event according to the received event information in synchronization with the device in which the specific event has occurred using synchronization information between the video content and the E-book content. The first and second devices both have the synchronization information.

In accordance with an aspect of another exemplary embodiment, there is provided a method of synchronizing E-book content and video content in an E-book device including the E-book content associated with the video content included in a first device. In the synchronization method, the E-book device is connected to the first device according to a specific protocol. If a specific event for the video content occurs in the first device, the E-book device receives event information about the specific event from the first device, and performs the specific event according to the received event information in synchronization with the first device using synchronization information between the video content and the E-book content.

In accordance with and aspect of another exemplary embodiment, there is provided a method of synchronizing E-book content and video content in an E-book device including the E-book content associated with the video content included in a first device. In the synchronization method, the E-book device is connected to the first device according to a specific protocol. If a specific event for the E-book content occurs in the E-book device, the E-book device generates event information about the specific event, transmits the event information to the first device, and performs the specific event according to the event information in synchronization with the first device using synchronization information between the video content and the E-book content.

In accordance with an aspect of another exemplary embodiment, there is provided a system of synchronizing a first device capable of displaying video content and including the video content, and a second device capable of displaying E-book content associated with the video content and including the E-book content. The first and second devices are connected to each other according to a specific protocol. If a specific event for the video content or the E-book content occurs in any one of the first and second devices, the device in which the specific event occurs generates event information about the specific event, transmits the event information to the other device, and performs the specific event according to the event information. The other device performs the specific event according to the received event information in synchronization with the device in which the specific event occurred, using synchronization information between the video content and the E-book content. The first and second devices both have the synchronization information.

In accordance with an aspect of another exemplary embodiment, there is provided an E-book device for synchronizing E-book content with video content that is included in a first device and associated with the E-book content. In the E-book device, if a specific event occurs in the first device, a transceiver receives event information about the specific event for the video content, which is generated by the first device. A storage element stores the E-book content and synchronization information between the video content and the E-book content. A controller connects the E-book device to the first device through the transceiver according to a specific protocol, and performs the specific event according to the received event information in synchronization with the first device using the synchronization information.

In accordance with an aspect of another exemplary embodiment, there is provided an E-book device for synchronizing E-book content with video content that is included in a first device and associated with the E-book content. In the E-book device, a storage element stores the E-book content and synchronization information between the video content and the E-book content, and a controller connects the E-book device to the first device according to a specific protocol. If a specific event for the E-book content occurs in the E-book device, the controller generates event information about the specific event, and performs the specific event according to the event information in synchronization with the first device using synchronization information. A transceiver transmits the event information to the first device.

BRIEF DESCRIPTION OF THE DRAWINGS

The above and other aspects will be more apparent from the following description of exemplary embodiments taken in conjunction with the accompanying drawings, in which.

DETAILED DESCRIPTION OF EXEMPLARY EMBODIMENTS

Figure 1:
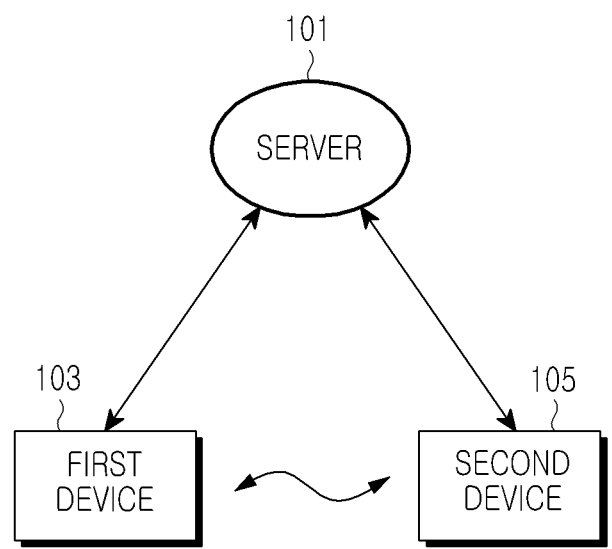
FIG. 1 is a diagram illustrating a system according to a first exemplary embodiment.

Exemplary embodiments of the present invention will now be described in detail with reference to the accompanying drawings. In the following description, specific details such as detailed configuration and components are merely provided to assist the overall understanding of exemplary embodiments of the present invention. Therefore, it should be apparent to those skilled in the art that various changes and modifications of the exemplary embodiments described herein can be made without departing from the scope and spirit of the invention. In addition, descriptions of well-known functions and constructions are omitted for clarity and conciseness.

Throughout the drawings, the same drawing reference numerals will be understood to refer to the same elements, features and structures.

Prior to a detailed description of the exemplary embodiments, the basic concept of the exemplary embodiments will be described.

A first exemplary embodiment is directed to a technology for connecting, over a wired and/or wireless communication network, a first device for displaying video content to a second device spaced apart from the first device and displaying E-book content associated with the video content, and synchronizing playback and/or search for the video content and the E-book content.

Information needed for an operation of the first exemplary embodiment of the present invention includes synchronization information between video content and E-book content, and event information about the video content or E-book content. The synchronization information refers to information indicating a mapping relationship between frames of video content and associated page and/or line information of E-book content. The event information refers to information needed to perform a specific event such as playback or search for video content or E-book content. For example, in the case of playback event for a specific frame of the video content, the event information may include a specific frame number of the video content.

In the first exemplary embodiment, if an event such as playback or search for video content or E-book content occurs in any one of the first and second devices, the device in which the event occurs transmits event information to the other device and performs the event. Upon receiving the event information, the other device may perform the event in a synchronized manner using the synchronization information and the event information.

The event information may be different according to the type of the event that occurs. For example, if the event that has occurred in the first device is a playback event for a specific frame of video content, the event information may include information about the specific frame and information about a playback time of the specific frame. If the event that has occurred in the first device is a search event for a specific frame of video content, the event information may include information indicating the specific frame. As another example, if an event that has occurred in the second device is a search event for a specific part of E-book content, the event information may include information about the specific part of the E-book content.

A second exemplary embodiment enables a device including a first display unit for displaying video content and a second display unit for displaying E-book content to play or search the video content and the E-book content in a synchronized manner. In addition, the second exemplary embodiment may separately provide a search bar capable of searching the entire video content fast and another search bar capable of fine searching a short period of the video content, thereby improving search performance for both fast search and fine search.

Now, exemplary embodiments will be described in detail.

FIG. 1 illustrates a system according to a first exemplary embodiment.

Referring to FIG. 1, a first device 103 is a multimedia device capable of displaying multimedia content such as video content. A second device 105 is an E-book device capable of displaying E-book content. A server 101 is connected to the first and second devices 103 and 105 in a wired and or wireless manner, and provides video content and E-book content thereto, respectively. For example, the server 101 may be a server for providing educational broadcast content, the first device 103 may be a TV or a Personal Computer (PC) for receiving the educational broadcast, and the second device 105 may be an E-book terminal.

In a case where real-time service is provided to the user, the first and second devices 103 and 105 may be connected to the server 101, and receive content from the server 101 in real time. In another case where non-real-time service is provided to the user, the first and second devices 103 and 105 may be adapted to store content provided in advance from the server 101 in their devices, respectively, and to display multimedia content and E-book content in association with each other even while disconnected from the server 101. The first and second devices 103 and 105 may not necessarily receive their content from the server 101. So, if the first and second devices 103 and 105 can acquire their content through other routes, the server 101 may not be included in the first exemplary embodiment of the present invention.

Figure 2:
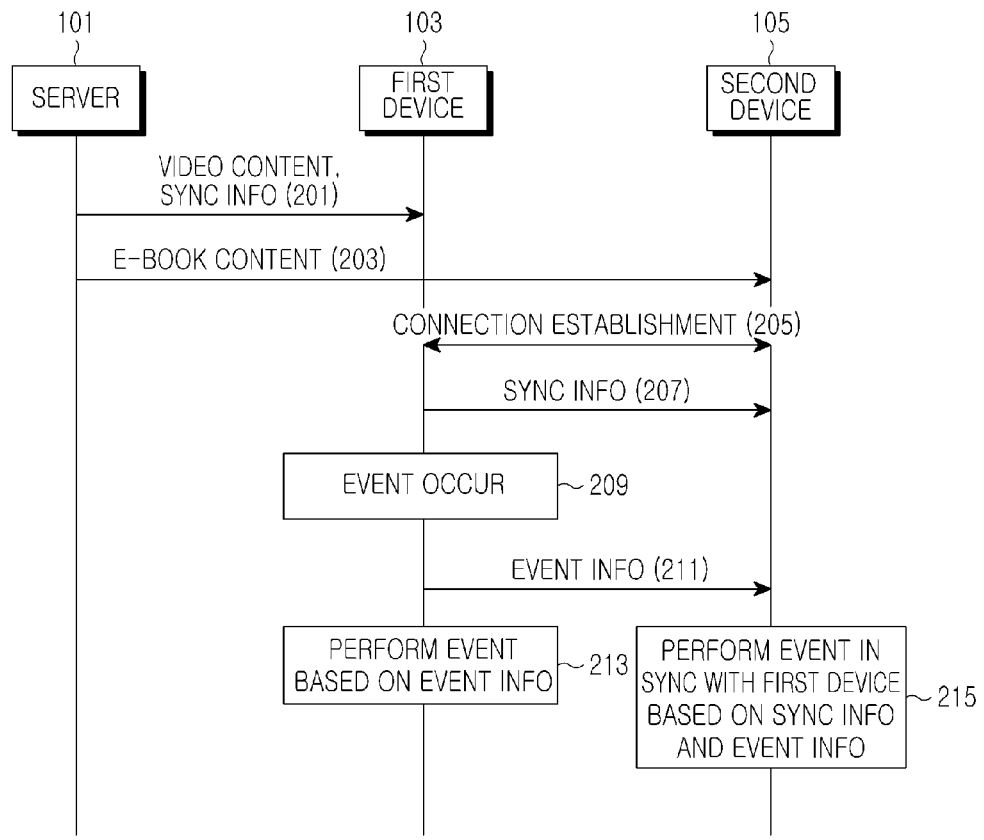
FIG. 2 is a diagram illustrating a method of synchronizing video content and E-book content according to the first exemplary embodiment.

FIG. 2 illustrates a method of synchronizing video content and E-book content according to the first exemplary embodiment.

Referring to FIG. 2, the server 101 provides video content and synchronization information between the video content and its associated E-book content to the first device 103 capable of playing video content (operation 201). The synchronization information may include information indicating a mapping relationship between frames of the video content and associated page and/or line information of the E-book content.

The server 101 provides E-book content associated with the video content to the second device 105 capable of displaying the E-book content (operation 203). Then, the first and second devices 103 and 105 establish a connection using a specific communication protocol to communicate with each other in a wired and/or wireless manner (operation 205). The connection may be established in many different ways known to one of ordinary skill in the art and therefore a detailed description thereof is not provided. Thereafter, the first device 103 transmits the synchronization information to the second device 105 through the established connection (operation 207).

If a specific event has occurred in the first device 103, the first device 103 generates event information about the specific event (operation 209) and transmits it to the second device 105 (operation 211), and then performs an event operation based on the specific event information (operation 213). Upon receiving the event information from the first device 103, the second device 105 performs the event in synchronization with the first device 103 using the synchronization information and the event information (operation 215).

In the example of FIG. 2, the synchronization information may be provided in video content in the form of metadata (e.g., a caption of foreign language video content). In this case, along with the operation being performed in the E-book terminal, the video content may be handled on a video player in the form of Picture-In-Picture (PIP). As a result, the user can view both video and text information on the video player, and even the E-book terminal may display the E-book content in a synchronized manner.

Now, possible modifications of FIG. 2 will be described.

While it is assumed in FIG. 2 that a playback or search event for video content has occurred in the first device 103 for displaying the video content, the same operation may be possible even when a playback or search event for E-book content has occurred in the second device 105. For example, if the second device 105 receives synchronization information from the server 101 and transmits it to the first device 103 and an event of searching for a specific page or word of E-book content has occurred in the second device 105, then the second device 105 transmits the relevant event information to the first device 103 and the first device 103 may display video content corresponding to the specific page or word of the E-book content according to the received event information in a synchronized manner.

Also, it is assumed in FIG. 2 that the first device 103 transmits the synchronization information to the second device 105. However, as an example of another modification, the server 101 may directly transmit the synchronization information to the second device 105 without passing it through the first device 103. In this case, operation 207, in which the first device 103 transmits the synchronization information to the second device 105, may be optional.

In addition, while it is assumed in FIG. 2 that both of the first and second devices 103 and 105 have the synchronization information, only the first device 103 may have the synchronization information. In this case, if a specific event has occurred in the first device 103, the first device 103 should generate and transmit event information allowing the second device 105 to perform the specific event in synchronization with the first device 103. For example, if a playback event for a specific frame of video content has occurred in the first device 103, the first device 103 generates event information including E-book content's page information corresponding to the specific frame of the video content using its synchronization information, and transmits it to the second device 105. The second device 105 displays the relevant page using the E-book content's page information included in the event information. The same operation is possible even when the event has occurred in the second device 105.

Now, examples of the event in FIG. 2 will be described.

As an example of the event, if no operation is requested within a predetermined time after the connection establishment in operation 205, this event may be defined as a default event. If the default event occurs, the first device 103 transmits event information including playback time information of video content to the second device 105 in operation 211, and starts playing the video content at the playback time in operation 213. Meanwhile, the second device 105 displays E-book content in synchronization with the video content being played on the first device 103 using the video content's playback time information and the synchronization information. In the case where the default event is not defined, if no event occurs within a predetermined time, the first and second devices 103 and 105 may perform no operation.

As another example of the event, if an event of requesting to play a specific frame of video content, or requesting to play the video content beginning from a specific frame, has occurred in the first device 103, then the first device 103 transmits event information including the play-requested frame information and playback time information to the second device 105, and starts playing the play-requested frame at the playback time. The second device 105 displays E-book content corresponding to the play-requested frame information at the playback time in synchronization with the first device 103 using the synchronization information.

As a further example of the event, if an event of requesting to search for a specific frame of video content has occurred in the first device 103, the first device 103 transmits event information including the search-requested frame information to the second device 105, and displays the search-requested frame. The second device 105 displays E-book content in synchronization with the frame being displayed on the first device 103, using the search-requested frame information and the synchronization information.

An event performed in the second device 105 may automatically turn over a page or highlight a specific part in a certain page of the E-book content corresponding to a video content being played on the first device 103.

If it is assumed that a specific event occurs in the second device 105 rather than in the first device 103 as shown in FIG. 2, the second device 105 generates event information corresponding to the specific event and transmits it to the first device 103, and performs the specific event for the E-book content on a display according to the generated event information, and the first device 103 may perform an event for video content in synchronization with the specific event for the E-book content according to the synchronization information and the event information received from the second device 105.

Figure 3:
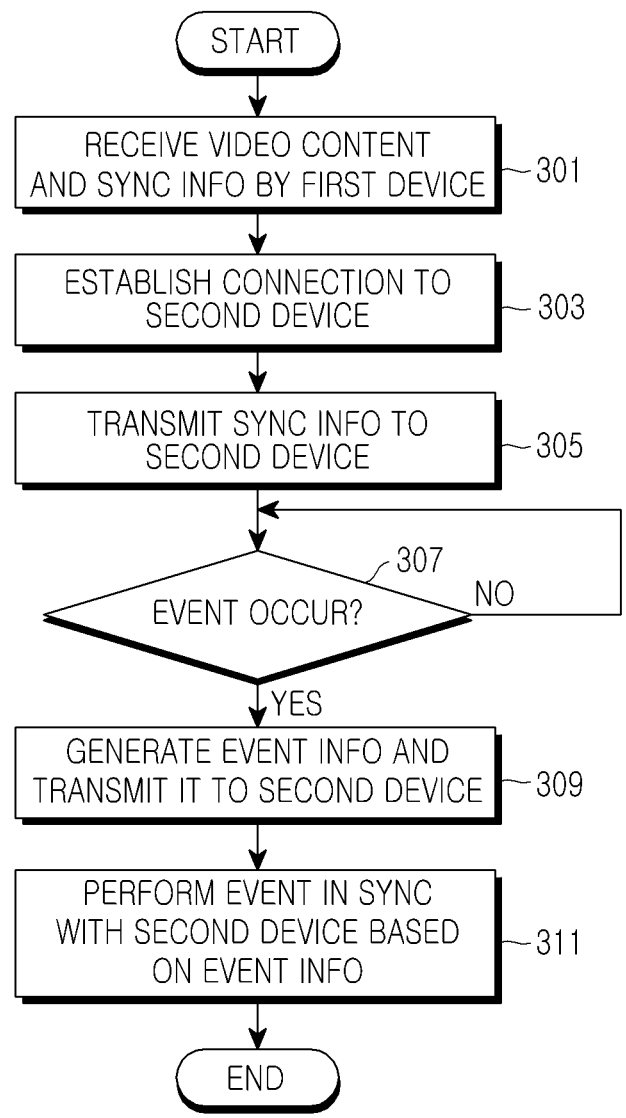
FIG. 3 is a diagram illustrating an operation of the first device in FIG. 2 according to the first exemplary embodiment.

FIG. 3 illustrates an operation of the first device in FIG. 2 according to the first exemplary embodiment.

The first device 103 receives at least one of video content and synchronization information from the server 101 (operation 301), establishes a connection to the second device 105 (operation 303), and transmits the synchronization information to the second device 105 (operation 305). If an event has occurred in the first device 103 (operation 307), the first device 103 generates event information regarding the event and transmits it to the second device 105 (operation 309) so that the second device 105 may perform the event in synchronization with the first device 103. After transmitting the event information to the second device 105, the first device 103 performs the event in synchronization with the second device 105 according to the event information (operation 311).

Figure 4:
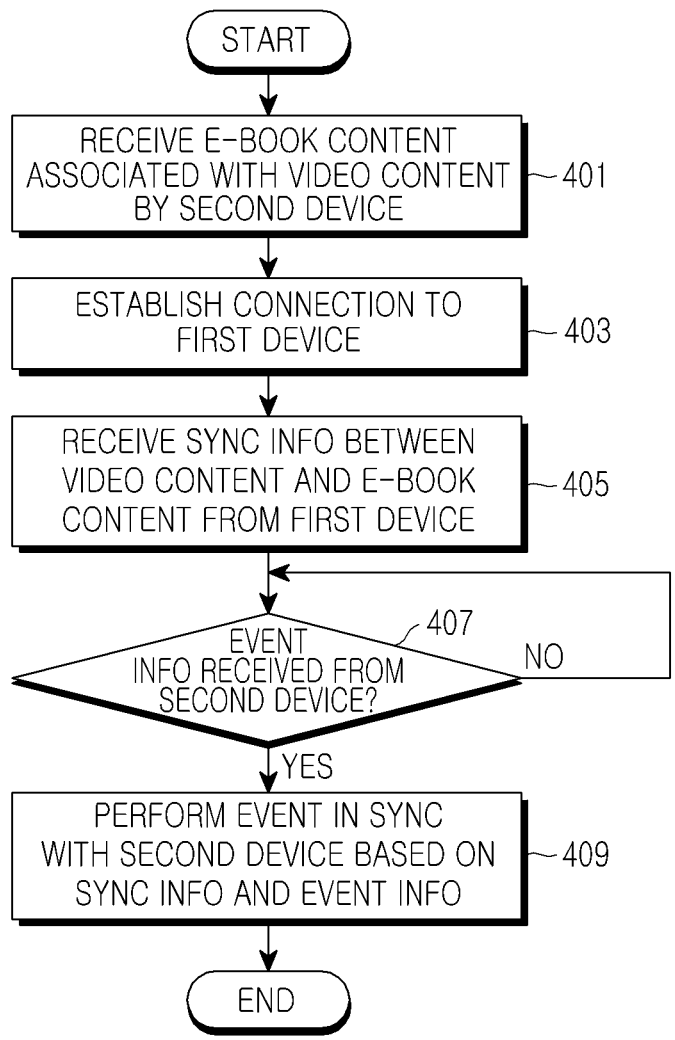
FIG. 4 is a diagram illustrating an operation of the second device in FIG. 2 according to the first exemplary embodiment.

FIG. 4 illustrates an operation of the second device in FIG. 2 according to the first exemplary embodiment of the present invention.

The second device 105 receives E-book content associated with video content from the server 101 (operation 401), establishes a connection to the first device 103 (operation 403), and receives synchronization information between the video content and the E-book content from the first device 103 (operation 405). Upon receiving event information from the first device 103 (operation 407), the second device 105 performs an operation corresponding to the event in synchronization with the first device 103 according to the event information and the synchronization information (operation 409) received in operation 405.

Figure 5:
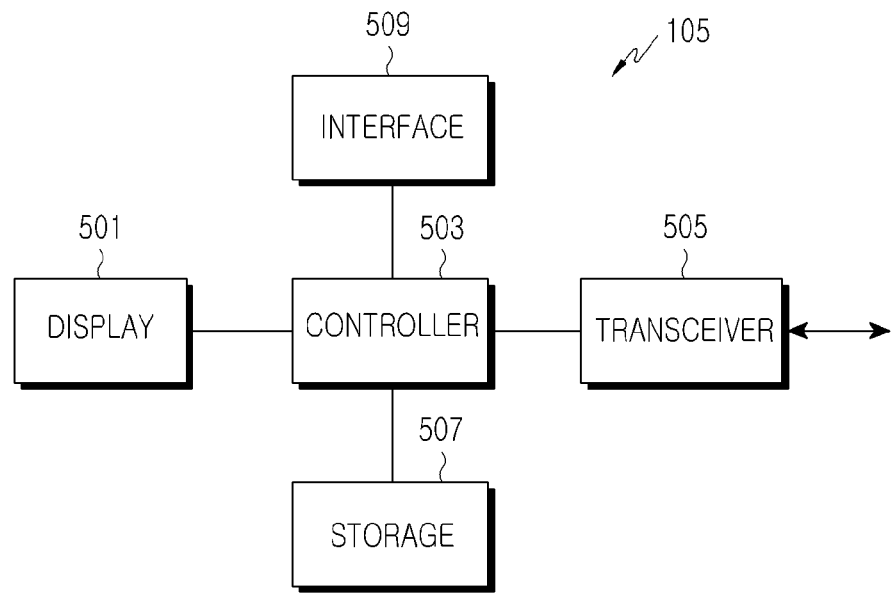
FIG. 5 is a diagram illustrating a structure of the second device in FIG. 2 according to the first exemplary embodiment.

FIG. 5 illustrates a structure of the second device in FIG. 2 according to the first exemplary embodiment.

Referring to FIG. 5, the second device 105 is an E-book device capable of displaying E-book content. The controller 503 receives E-book content from the server 101 through a transceiver 505 and stores it in a storage element 507. The controller 503 establishes a connection to the first device 103 via the transceiver 505 according to a specific protocol, receives synchronization information from the first device 103, and stores it in the storage element 507. Upon receiving event information from the first device 103 via the transceiver 505, the controller 503 displays E-book content corresponding to the event, for example, a specific frame of video content, on a display 501 in synchronization with the first device 103 according to the event information and the synchronization information.

However, if a specific event has occurred in the second device 105 or an E-book device, the controller 503 receives information indicating the occurrence of the specific event through an interface 509, generates event information corresponding to the specific event, transmits it to the first device 103 via the transceiver 505, and performs the specific event for the E-book content on the display 501 according to the generated event information.

The second exemplary embodiment of the present invention is directed to an E-book device capable of displaying video content and E-book content together.

Figure 6:
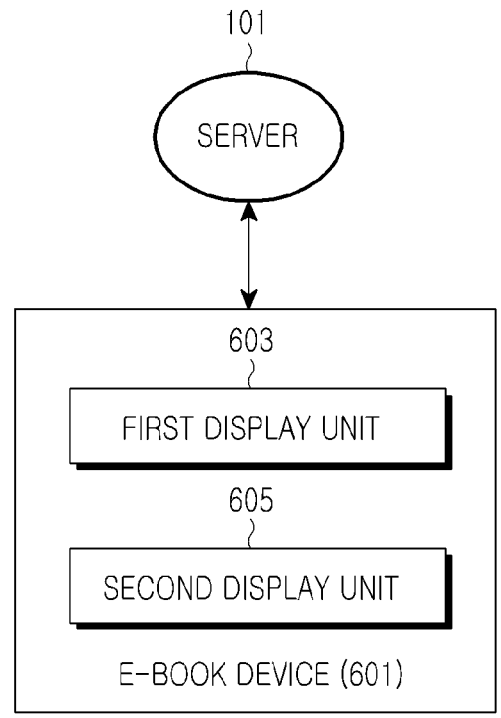
FIG. 6 is a diagram illustrating a system according to a second exemplary embodiment.

FIG. 6 illustrates a system according to the second exemplary embodiment.

Referring to FIG. 6, an E-book device 601 is connected to the server 101 in a wired and/or wireless manner, can receive video content and E-book content therefrom, and includes a first display unit 603 capable of displaying the video content and a second display unit 605 capable of displaying the E-book content. A detailed structure of the E-book device 601 is described below with reference to FIG. 7.

Figure 7:
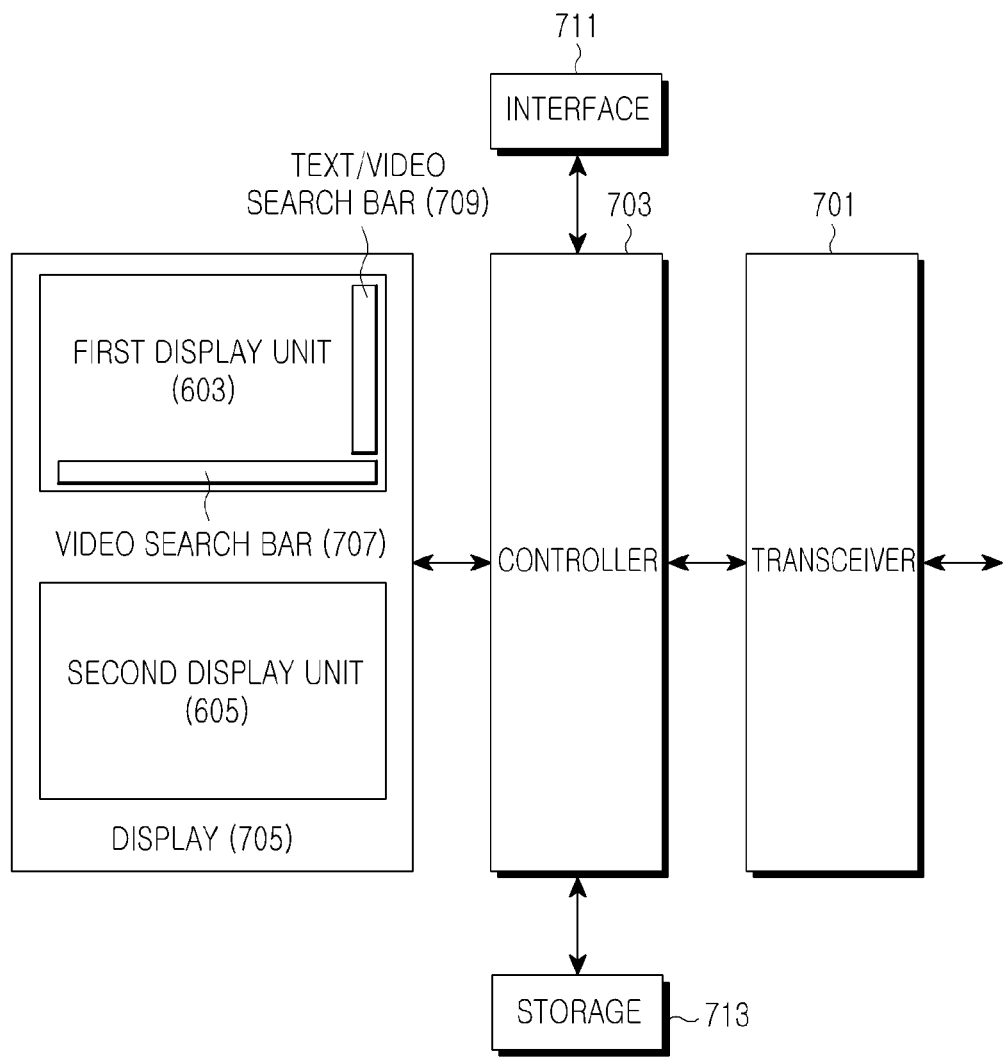
FIG. 7 is a diagram illustrating a structure of an E-book device according to the second exemplary embodiment.

FIG. 7 illustrates a structure of an E-book device according to the second exemplary embodiment.

A transceiver 701 receives from the server 101 at least one of video content, E-book content, and synchronization information between the video content and the E-book content, and transfers the received information to a controller 703. The controller 703 stores the video content, E-book content and synchronization information in a storage element 713.

An interface 711 refers to means for delivering an event input by a user to the controller 703, and its most typical example may be a keypad. If a display 705 is a touch screen, the touch screen may also be a component of the interface 711.

The controller 703 displays the video content and E-book content stored in the storage element 713 on the display 705 in a synchronized manner using the synchronization information according to the event information received through the interface 711.

The display 705 includes the first display unit 603 for displaying the video content under the control of the controller 703 and the second display unit 605 for displaying the E-book content. The first display unit 603 includes at least one of a video search bar 707 and a text/video search bar 709.

The video search bar 707 may be set to search the entire video content fast, and the text/video search bar 709 may be set to fine search the video content within the range of the E-book content presently displayed on the second display unit 605.

For example, assume an English conversation video content with a total length of 50 minutes is displayed on the first display unit 603 and script content for the video content is displayed on the second display unit 605 in a synchronized manner. The user may fast search the entire 50-minute English conversation video content, and may also fine search a specific part with a short length of, for example, two minutes of the total of 50 minutes. The user may use the video search bar 707 when fast searching the entire video content as in the former case, and may use the text/video search bar 709 when fine searching the video content as in the latter case.

If the user fast searches the entire video content using the video search bar 707, shifted-position information of the video search bar 707 is transferred to the controller 703, and the controller 703 displays video of the frame corresponding to the shifted position of the video search bar 707 on the first display unit 603. At the same time, the controller 703 displays E-book content corresponding to the frame being displayed on the first display unit 603, on the second display unit 605 in a synchronized manner using the synchronization information.

In order to search video content within the range of the E-book content displayed on the second display unit 605, the user may fine search the video content using the text/video search bar 709. In this case, a method of displaying the E-book content on the second display unit 605 in a synchronized manner may include highlighting a text line corresponding to the fine-searched video content, to distinguish it from other text presently being displayed on the second display unit 605.

Figure 8:
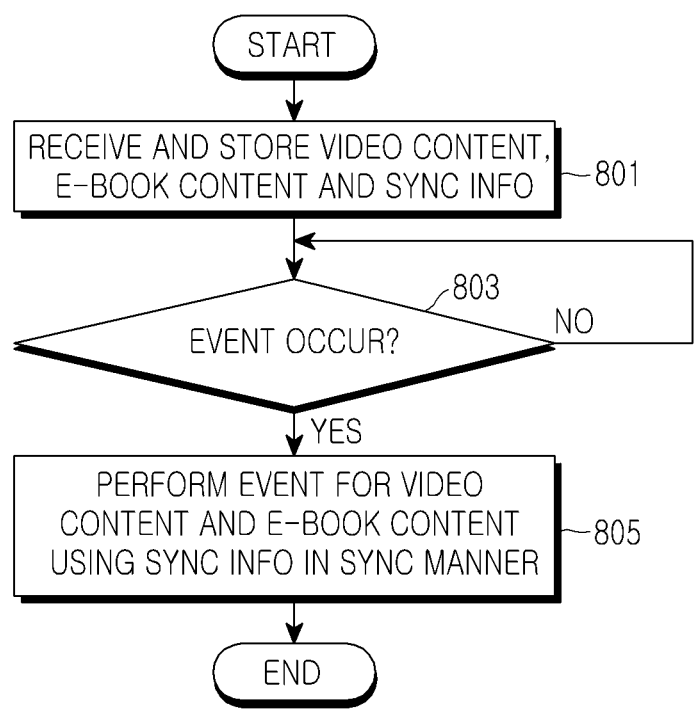
FIG. 8 is a diagram illustrating a method of synchronizing video content and E-book content in an E-book device according to the second exemplary embodiment.

FIG. 8 illustrates a method of synchronizing video content and E-book content in an E-book device according to the second exemplary embodiment.

The E-book device receives at least one of video content, E-book content associated with the video content, and synchronization information between the video content and the E-book content from the server 101 through the transceiver 701, and stores it in the storage element 713 through the controller 703 (operation 801).

The controller 703 monitors whether a specific event for the E-book content associated with the video content has occurred (operation 803) through the interface 711. If so, the controller 703 performs the specific event for the video content and the E-book content using the synchronization information in a synchronized manner (operation 805).

As an example of the event, if no operation is requested by the user after the contents and the synchronization information are stored in the storage element 713, this event may be defined as a default event. Upon occurrence of the default event, the controller 703 starts playing the video content on the first display unit 603, and displays the E-book content and the video content on the second display unit 605 using the synchronization information in a synchronized manner. If no event has occurred within a predetermined time with the default event undefined, the controller 703 may perform no operation.

As another example of the event, if an event of requesting to play a specific part of the video content has occurred through the interface 711, the controller 703 displays the play-requested video frame on the first display unit 603 and the E-book content synchronized with the play-requested video frame on the second display unit 605, using video frame information corresponding to the specific part and the synchronization information.

As a further example of the event, if an event of searching video content using the video search bar 707 has occurred, the controller 703 detects the search-requested video frame information using shifted-position information of the video search bar 707, and displays the detected frame on the first display unit 603. In addition, the controller 703 displays E-book content corresponding to the frame being displayed on the first display unit 603, on the second display unit 605 in a synchronized manner using the search-requested frame information and the synchronization information. By searching the video content using the video search bar 707 in this way, the E-book device may fast search the user-desired part of the entire video content.

Also, if an event of searching video content using the text/video search bar 709 has occurred, the controller 703 displays the video content within the range of the E-book content presently being displayed on the second display unit 605, on the first display unit 603 using shifted-position information of the text/video search bar 709. At the same time, the controller 703 displays the E-book content corresponding to the video content being displayed on the first display unit 603, on the second display unit 605 in a synchronized manner using the synchronization information. In this case, a method of displaying the E-book content on the second display unit 605 in a synchronized manner may include highlighting a text line corresponding to the fine-searched video content, to distinguish it from the other texts presently being displayed on the second display unit 605. By searching the video content within the range of the E-book content being displayed on the second display unit 605 using the text/video search bar 709 in this way, the user may fine search his or her desired video content.

While the invention has been shown and described with reference to certain exemplary embodiments thereof, it will be understood by those skilled in the art that various changes in form and details may be made therein without departing from the spirit and scope of the inventive concept as defined by the appended claims and their equivalents.

What is claimed is:

1. A method of playing E-book content, the method comprising:
   receiving, by an E-book display device, event information for a first event in a multimedia display device; and
   performing, by the E-book display device, a second event corresponding to the first event,
   wherein the first event and second event are performed synchronously using synchronization information.

2. The method of claim 1, further comprising:
   when a search event for the E-book content occurs, generating a search event information including at least one of page information and line information of the E-book content; and
   transmitting the generated search event information to the multimedia display device.

3. The method of claim 1, wherein if the first event is a playback event for a frame of the multimedia content, the event information for the first event includes number of the frame and playback time of the frame.

4. The method of claim 1, wherein if the first event is a search event for a frame of the multimedia content, the event information for the first event includes number of the frame.

5. The method of claim 4, further comprising:
   displaying the E-book content corresponding to the frame in a predetermined scheme to distinguish from other E-book content.

6. The method of claim 1, wherein the synchronization information includes information for frames of the multimedia content and information for at least one of page and line of the E-book content corresponding to frames.

7. The method of claim 1, wherein the multimedia display device and the E-book display device have the synchronization information.

8. The method of clam 1, wherein the multimedia display device and the E-book display device are implemented in one device.

9. The method of clam 8, wherein the multimedia display device includes a first search bar for searching in a total range of the multimedia content and a second search bar for searching in a range corresponding to E-book content currently displayed in the E-book display device.

10. A method of playing multimedia content, the method comprising:
    receiving, by a multimedia display device, event information for a second event in an E-book display device; and
    performing, by the multimedia display device, a first event corresponding to the second event,
    wherein the first event and second event are performed synchronously using synchronization information.

11. The method of clam 10, wherein if the second event is a search event for the E-book content, the event information for the second event includes at least one of page information and line information of the E-book content.

12. The method of clam 11, further comprising:
displaying multimedia content corresponding to the at least one of page information and line information of the E-book content.

13. The method of clam 10, further comprising:
when a third event occurs in the multimedia display device, generating information for the third event; and
transmitting the information for the third event to the E-book display device.

14. The method of claim 13, when if the third event is a playback event for a frame of the multimedia content, the information for the third event includes number of the frame and playback time of the frame.

15. The method of claim 13, wherein if the third event is a search event for a frame of the multimedia content, the information for the third event includes number of the frame.

16. The method of claim 10, wherein the synchronization information includes information for frames of the multimedia content and information for at least one of page and line of the E-book content corresponding to frames.

17. The method of claim 10, wherein the multimedia display device and the E-book display device have the synchronization information.

18. The method of clam 10, wherein the multimedia display device and the E-book display device are implemented in one device.

19. The method of clam 18, wherein the multimedia display device includes a first search bar for searching in a total range of the multimedia content and a second search bar for searching in a range corresponding to E-book content currently displayed in the E-book display device.

20. An E-book display device for playing E-book content, the E-book display device comprising:
a transceiver capable of receiving event information for a first event in a multimedia display device; and
a controller capable of performing a second event corresponding to the first event,
wherein the first event and second event are performed synchronously using synchronization information.

21. The E-book display device of claim 20, wherein when a search event for the E-book content occurs, the controller generates a search event information including at least one of page information and line information of the E-book content and transmits the generated search event information to the multimedia display device.

22. The E-book display device of claim 20, wherein if the first event is a playback event for a frame of the multimedia content, the event information for the first event includes number of the frame and playback time of the frame.

23. The E-book display device of claim 20, wherein if the first event is a search event for a frame of the multimedia content, the event information for the first event includes number of the frame.

24. The E-book display device of claim 23, wherein the E-book display device further comprising:
a display capable of displaying the E-book content corresponding to the frame in a predetermined scheme to distinguish from other E-book content.

25. The E-book display device of claim 20, wherein the synchronization information includes information for frames of the multimedia content and information for at least one of page and line of the E-book content corresponding to frames.

26. The E-book display device of claim 20, wherein the multimedia display device and the E-book display device have the synchronization information.

27. The E-book display device of clam 20, wherein the multimedia display device and the E-book display device are implemented in one device.

28. The E-book display device of clam 27, wherein the multimedia display device includes a first search bar for searching in a total range of the multimedia content and a second search bar for searching in a range corresponding to E-book content currently displayed in the E-book display device.

29. A multimedia display device for playing multimedia content, the multimedia display device comprising:
a transceiver capable of receiving event information for a second event in an E-book display device; and
a controller capable of performing a first event corresponding to the second event,
wherein the first event and second event are performed synchronously using synchronization information.

30. The multimedia display device of clam 29, wherein if the second event is a search event for the E-book content, the event information for the second event includes at least one of page and line of the E-book content.

31. The multimedia display device of clam 30, wherein the multimedia display device further comprising:
a display capable of displaying multimedia content corresponding to the at least one of page and line of the E-book content.

32. The multimedia display device of clam 29, wherein when a third event occurs in the multimedia display device, the controller generates information for the third event and transmits the information for the third event to the E-book display device.

33. The multimedia display device of claim 32, when if the third event is a playback event for a frame of the multimedia content, the information for the third event includes number of the frame and playback time of the frame.

34. The multimedia display device of claim 32, wherein if the third event is a search event for a frame of the multimedia content, the information for the third event includes number of the frame.

35. The multimedia display device of claim 29, wherein the synchronization information includes information for frames of the multimedia content and information for at least one of page and line of the E-book content corresponding to frames.

36. The multimedia display device of claim 29, wherein the multimedia display device and the E-book display device have the synchronization information.

37. The multimedia display device of claim 29, wherein the multimedia display device and the E-book display device are implemented in one device.

38. The multimedia display device of clam 37, wherein the multimedia display device includes a first search bar for searching in a total range of the multimedia content and a second search bar for searching in a range corresponding to E-book content currently displayed in the E-book display device.

* * * * *